(12) United States Patent
Spitsberg et al.

(10) Patent No.: US 9,377,091 B2
(45) Date of Patent: Jun. 28, 2016

(54) SHAFT ASSEMBLIES SUITABLE FOR CIRCUIT BREAKERS AND RELATED CIRCUIT BREAKERS

(71) Applicant: Eaton Corporation, Cleveland, OH (US)

(72) Inventors: Yuri Spitsberg, Export, PA (US); Perry Robert Gibson, East Palestine, OH (US); David Parks, Baden, PA (US)

(73) Assignee: Eaton Corporation, Cleveland, OH (US)

( * ) Notice: Subject to any disclaimer, the term of this patent is extended or adjusted under 35 U.S.C. 154(b) by 52 days.

(21) Appl. No.: 13/923,653

(22) Filed: Jun. 21, 2013

(65) Prior Publication Data

US 2014/0373671 A1    Dec. 25, 2014

(51) Int. Cl.
*F16H 53/00*    (2006.01)
*F16H 25/08*    (2006.01)
*H01H 3/30*    (2006.01)
*H01H 71/10*    (2006.01)
*H01H 71/02*    (2006.01)

(52) U.S. Cl.
CPC .............. *F16H 25/08* (2013.01); *H01H 3/3015* (2013.01); *H01H 71/10* (2013.01); *H01H 2071/0242* (2013.01); *Y10T 74/2102* (2015.01)

(58) Field of Classification Search
USPC .......... 74/567, 568 R; 200/19.03, 19.13, 19.2
See application file for complete search history.

(56) References Cited

U.S. PATENT DOCUMENTS

| 141,548 | A | * | 8/1873 | Elderfield | .................... 74/568 R |
|---|---|---|---|---|---|
| 2,418,757 | A | * | 4/1947 | Collins | ........................ 74/568 R |
| 2,577,319 | A | * | 12/1951 | Feitl | ............................... 411/521 |
| 3,289,494 | A | * | 12/1966 | Gaffney | ....................... 74/568 R |
| 5,048,366 | A | * | 9/1991 | Spanio | ............................ 74/567 |
| 5,131,504 | A | | 7/1992 | Yoo et al. | |
| 5,735,171 | A | * | 4/1998 | Moote et al. | ...................... 74/42 |
| 5,816,207 | A | * | 10/1998 | Kadokawa | ............. F01L 1/047 123/90.42 |
| 6,015,959 | A | | 1/2000 | Slepian et al. | |
| 7,186,937 | B1 | | 3/2007 | Ricciuti et al. | |
| 7,484,296 | B2 | * | 2/2009 | Merz | ............................ 29/888.1 |
| 8,222,983 | B2 | | 7/2012 | Zhou et al. | |
| 2012/0205226 | A1 | | 8/2012 | Gottschalk et al. | |

OTHER PUBLICATIONS

Invitation to Pay Additional Fees for corresponding PCT Application No. PCT/US2014/038566, 7 pages, date of mailing Sep. 10, 2014.
Catalogue SEEGER®—RINGS, Seeger-Orbis GmbH & Co. OHG, 1999, 141 pages.

(Continued)

*Primary Examiner* — Vicky Johnson
(74) *Attorney, Agent, or Firm* — Myers Bigel & Sibley, P.A.

(57) ABSTRACT

Shaft assemblies include an elongate shaft having a plurality of closely spaced apart external notches with wall segments having a greater outer diameter than an outer diameter of the notches residing therebetween and at least one self-retaining locking ring that engages one of the notches to axially lock into position on the shaft and provide a pull out force that is between about 100 lbf to about 1000 lbf. The notches can have a width that is between about 0.010 inches to about 0.020 inches, on average, and a depth that is between about 0.001 inches to about 0.010 inches, on average.

7 Claims, 7 Drawing Sheets

(56) References Cited

OTHER PUBLICATIONS

Black-Finish Steel Self-Locking External Retaining Ring, McMaster-Carr®, Part No. 98430A152, http://www.mcmaster.com, © 2011, 1 page.

International Search Report and Written Opinion for corresponding PCT Application No. PCT/US2014/038566, date of mailing Mar. 26, 2015, 20 pages.

* cited by examiner

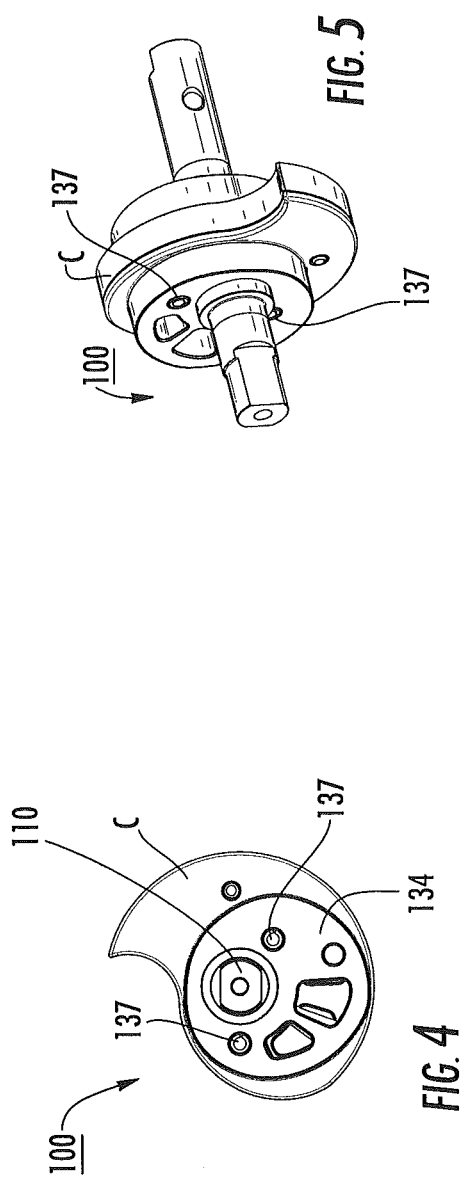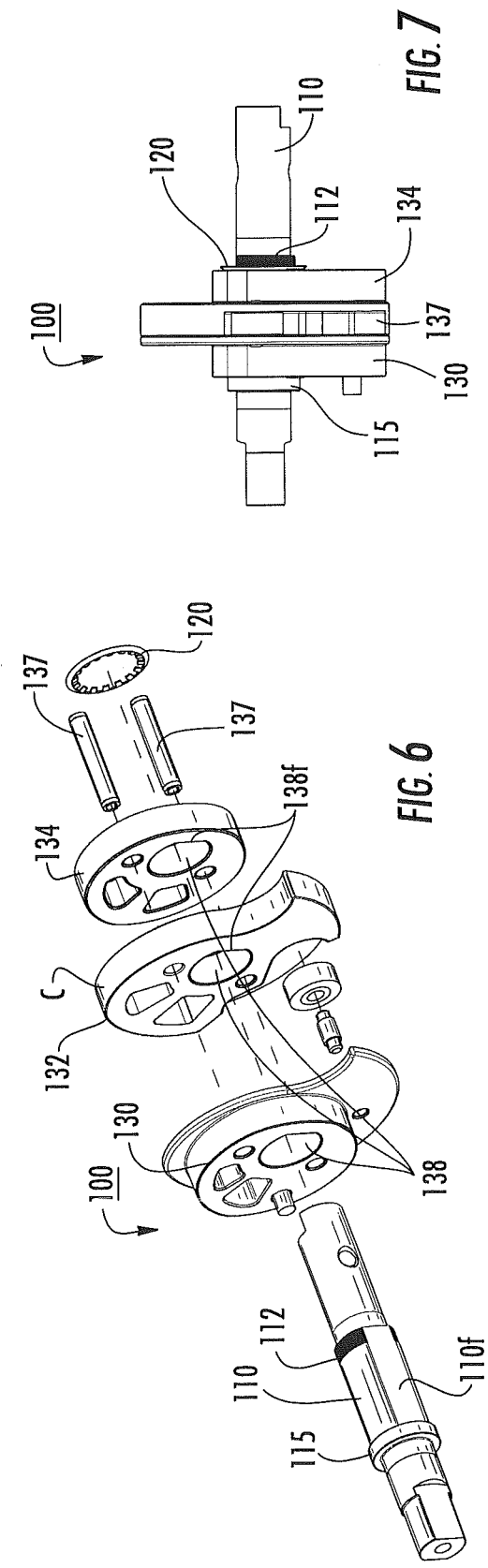

CAST CAM SHAFT OPTIMIZATION

| SAMPLE | φ A (INCH) | φ B (INCH) | C (INCH) | D (INCH) | E (INCH) | PULL OFF FORCE (LBS) | COMMENT |
|---|---|---|---|---|---|---|---|
| 1 | N/A | .875 | N/A | N/A | N/A | 53.364 | NO GROOVES |
| 2 | N/A | .880 | N/A | N/A | N/A | 41.213 | NO GROOVES |
| 3 | N/A | .885 | N/A | N/A | N/A | 42.633 | NO GROOVES |
| 4 | .865 | .875 | .005 | .010 | .015 | 447.52 | |
| 5 | .870 | .880 | .005 | .010 | .015 | 470.99 | |
| 6 | .875 | .885 | .005 | .010 | .015 | 497.38 | |
| 7 | .865 | .875 | .005 | .010 | .010 | 374.56 | |
| 8 | .870 | .880 | .005 | .010 | .010 | 428.22 | |
| 9 | .875 | .885 | .005 | .010 | .010 | 595.86 | MAXIMUM FORCE |

US 9,377,091 B2

SHAFT ASSEMBLIES SUITABLE FOR CIRCUIT BREAKERS AND RELATED CIRCUIT BREAKERS

FIELD OF THE INVENTION

The present invention relates to shaft assemblies particularly suitable for circuit breakers.

BACKGROUND OF THE INVENTION

Circuit breakers are one of a variety of overcurrent protection devices used for circuit protection and isolation. The circuit breaker provides electrical protection whenever an electric abnormality occurs. In a circuit breaker, current enters the system from a power line and passes through a line conductor to a stationary contact fixed on the line conductor, then to a movable contact. The movable contact can be fixedly attached to a pivoting arm. As long as the stationary and movable contacts are in physical contact, current passes from the stationary contact to the movable contact and out of the circuit breaker to down line electrical devices.

In the event of an overcurrent condition (e.g., a short circuit), extremely high electromagnetic forces can be generated. The electromagnetic forces repel the movable contact away from the stationary contact. As shown by an example of a prior art circuit breaker in FIG. 1, the circuit breaker 10 includes a stationary contact 30, a moveable arm 35, and a mechanism assembly 10m with a cam assembly 100 that includes a "C" that communicates with a cam follower 50. Because the movable contact 35c is fixedly attached to the rotating arm 35, the arm 35 pivots and physically separates the stationary 30 and movable contacts 35c, thus tripping the circuit. Upon separation of the contacts and blowing open the circuit, an arcing condition occurs. The breaker's trip unit will trip the breaker which will cause the contacts to separate.

FIGS. 2A and 2B illustrate an example of the mechanism assembly 10m with the cam assembly 100. Conventionally, the cam assembly 100 holds the components on the shaft 101 via rivets.

SUMMARY OF EMBODIMENTS OF THE INVENTION

Embodiments of the present invention are directed to circuit breakers with cam assemblies that include self-locking retaining rings that cooperate with a shaft.

Embodiments of the invention are directed to cam assemblies for circuit breakers. The cam assemblies include: (a) a shaft comprising at least one notch; (b) a cam held on the shaft; and (c) at least one self-retaining locking ring that engages a respective one of the at least one notch to lock the cam in position on the shaft.

The cam assembly may also include a hub held on the shaft longitudinally spaced apart from the at least one notch. The cam can be locked in an axial position on the shaft between the hub and locking ring.

The at least one notch can be a plurality of closely spaced circumferentially extending notches with centerlines of adjacent notches spaced between about 0.001 inches to about 0.020 inches apart.

The cam can include a plurality of cooperating components that are held in abutting contact on the shaft using the at least one locking ring.

The cam assembly can be in combination with a circuit breaker having a housing with the cam assembly held inside the housing. The shaft and cam can be non-ferromagnetic cast metal or metal alloy components.

The at least one notch can include at least one circumferentially extending notch that is discontinuous about a perimeter of the shaft with opposing perimeter portions of a respective notch being separated by at least one flat segment.

The at least one notch can be a plurality of spaced apart circumferentially extending notches with wall segments having a greater outer diameter residing therebetween. The notches can have a substantially constant width that is between about 0.010 inches to about 0.020 inches, on average, and a depth that is between about 0.001 inches to about 0.010 inches, on average.

The at least one notch can be a plurality of notches with a depth of about 0.005 inches, average, and a substantially constant width (in an axial direction) that is between about 0.010 inches and about 0.015 inches, average.

The at least one notch can be a plurality of spaced apart circumferentially extending notches with a respective substantially constant width and with wall segments having a greater outer diameter than a diameter or diameters of the notches residing therebetween.

The wall segments can have a respective width that is less than the width of the notches.

The wall segments can have a respective width that is the same as the width of the notches.

The wall segments can have a respective width that is greater than the width of the notches.

The at least one locking ring can engage the shaft to define an axial pull off force that is between about 100 lbf to about 1000 lbf.

Other embodiments are directed to a mechanism assembly for circuit breaker. The assembly includes a cam assembly and a rotating contact arm in communication with the cam assembly. The cam assembly includes a shaft with at least one notch; a cam held on the shaft; and at least one self-retaining locking ring that engages a respective one of the at least one notch to lock the cam in position on the shaft.

The at least one notch can be a plurality of closely spaced circumferentially extending notches with centerlines of adjacent notches spaced between about 0.001 inches to about 0.020 inches apart.

The cam can include a plurality of cooperating components that are held in abutting contact at a defined axial location on the shaft using the at least one locking ring.

The shaft and cam can be non-ferromagnetic cast metal or metal alloy components.

The at least one notch can include a plurality of notches that are discontinuous in a circumferential direction with opposing perimeter portions separated by at least one flat segment.

The at least one notch can be a plurality of spaced apart notches with wall segments having a greater outer diameter than an outer diameter of the notches residing therebetween. The notches can have a width that is between about 0.010 inches to about 0.020 inches, on average, and a depth that is between about 0.001 inches to about 0.010 inches, on average.

Still other embodiments are directed to a shaft assembly. The shaft assembly includes an elongate shaft having a plurality of closely spaced apart circumferentially extending external notches with wall segments having a greater outer diameter than an outer diameter of the notches residing therebetween. The notches can have a width that is between about 0.010 inches to about 0.020 inches, on average, and a depth that is between about 0.001 inches to about 0.010 inches, on average. The assemblies can include at least one self-retaining locking ring that engages one of the notches to axially lock into position on the shaft and provide a pull out force that is between about 100 lbf to about 1000 lbf.

The at least one notch can be a plurality of notches with a depth of about 0.005 inches, average, and a width between about 0.010 inches and about 0.015 inches, average.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 4 is an end view of the cam assembly shown in FIG. 3 according to embodiments of the present invention.

FIG. 5 is a side perspective view of the cam assembly shown in FIG. 4.

FIG. 6 is an exploded view of the cam assembly shown in FIG. 3.

FIG. 7 is a side view of the cam assembly shown in FIG. 3.

DETAILED DESCRIPTION OF EMBODIMENTS OF THE INVENTION

Figure 1:
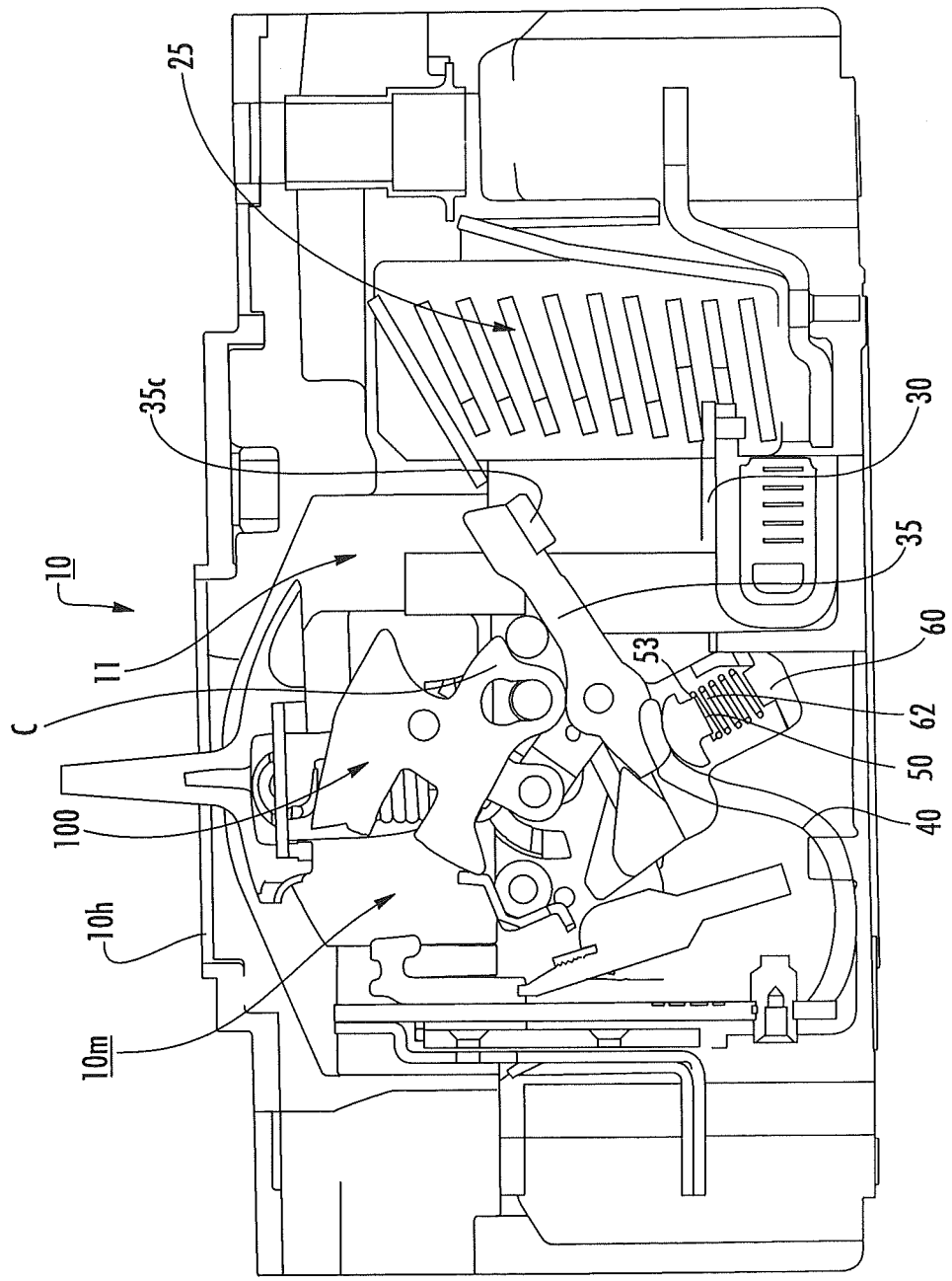
FIG. 1 is a side partial cutaway view of an exemplary prior art circuit breaker.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 40, 40', 40", 40''').

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

The term "non-ferromagnetic" means that the noted component is substantially free of ferromagnetic materials so as to be suitable for use in the arc chamber (non-disruptive to the magnetic circuit) as will be known to those of skill in the art.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The term "self-retaining" with respect to a locking ring means that the locking ring engages a shaft to lock into axial position and requires no other component.

Turning now to the figures, FIG. 1 illustrates a circuit breaker 10 with a housing 10*h*. As is well known, in the housing 10*h*, the circuit breaker 10 includes at least one arc chamber 11 having an arc chute 25 with arc plates, a mechanism assembly 10*m* with a rotating arm 35 with a contact 35*c* (e.g., a "contact arm") and a line conductor assembly comprising a stationary contact 30. The arc plates can be stacked and are typically configured as closely spaced plates as shown.

The circuit breaker 10 also includes a cam assembly 100 with a cam C. The cam assembly 100 is typically part of the mechanism assembly 10m as shown in FIGS. 2A and 2B.

Referring again to FIG. 1, the circuit breaker 10 also includes a cam follower 50 that cooperates with the cam C and may optionally include a crossbar 60. The cam follower 50 can reside in a channel of the crossbar over a spring 62 or other biasing member, allowing the cam follower 50 to travel up and down a distance while a lower post 53 is retained in the channel. However, it is noted that the invention is not limited to this circuit breaker configuration and other cam and cam follower configurations may be used.

The cam C and cam follower 50 can comprise non-ferromagnetic electrically conductive material.

Figure 2A:
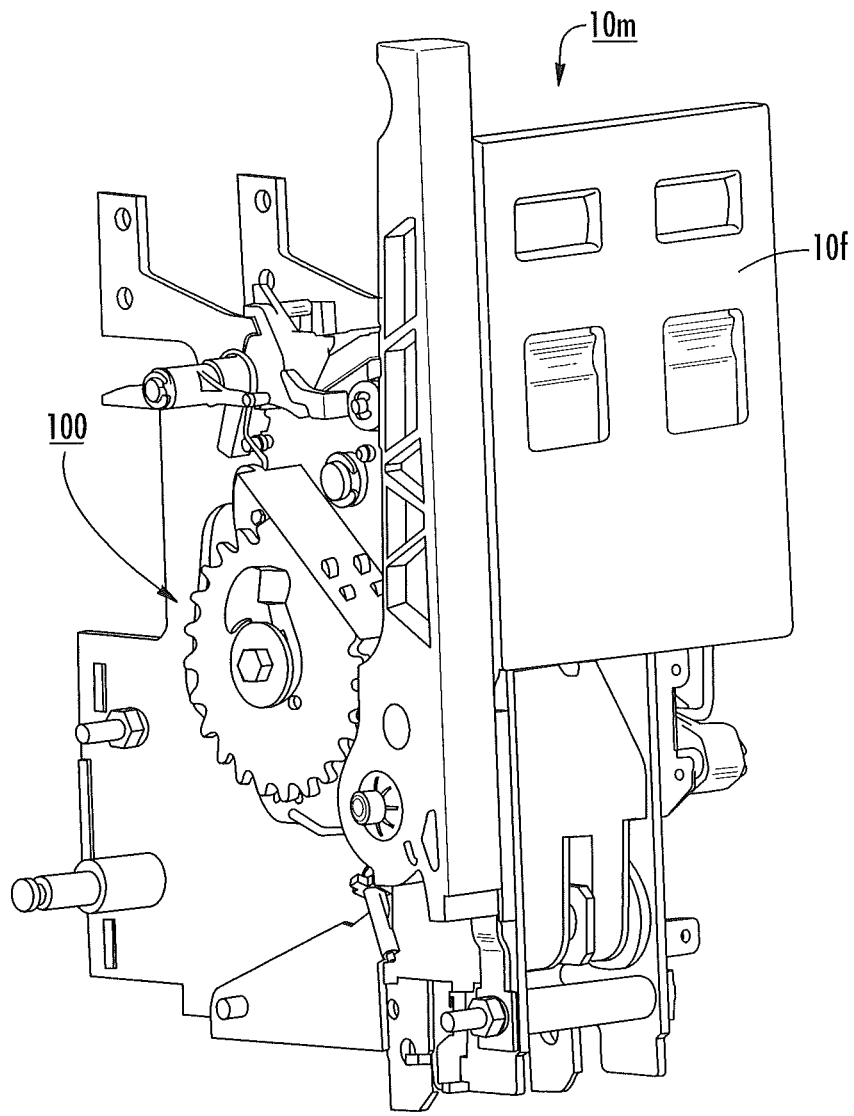
FIG. 2A is a front, side partial cutaway perspective view of a prior art mechanism assembly used in a circuit breaker.
Figure 2B:
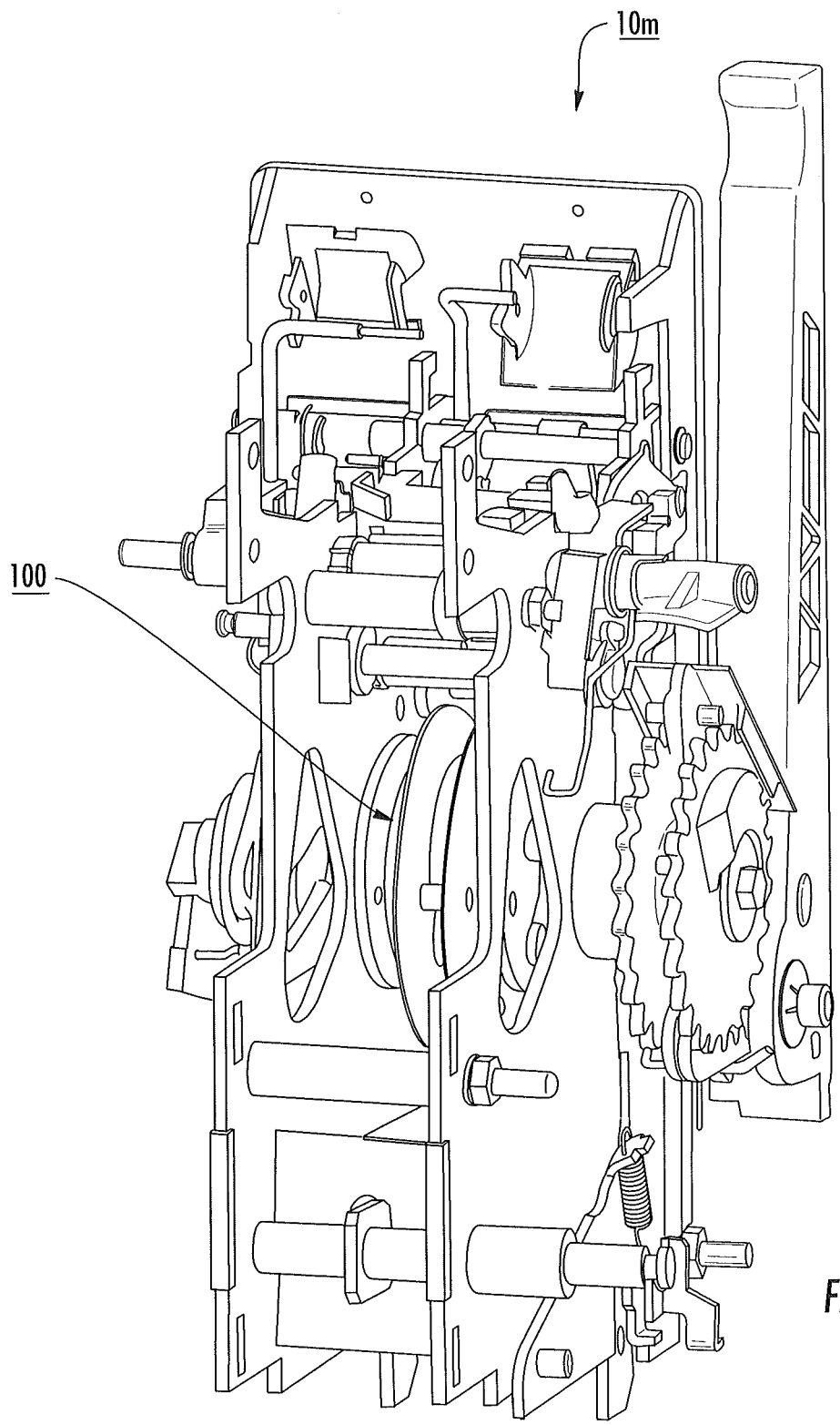
FIG. 2B is a rear perspective view of a mechanism assembly.

Conventionally, as shown in FIGS. 2A and 2B, the circuit breaker 10 has a housing 10h and mechanism assembly 10m had a cam assembly 100 that was assembled using rivets. The housing 10h can have a front 10f and an interior compartment for holding the mechanism assembly 10m. The riveted configuration can require relatively tight tolerances and/or may result in a relatively low axial pull out force for components held on the shaft 110.

FIGS. 3-7 illustrate one embodiment of a new cam assembly 100 that can be used in the circuit breaker 10 and, more particularly, in the mechanism assembly 10m such as the one shown in FIG. 2B, for example. The cam assembly 100 includes a shaft 110 with at least one notch 112, typically a series of closely spaced notches 112, that cooperate with at least one self-locking retaining ring 120, typically only requiring a single ring 120. The shaft 110 holds the cam C.

The cam C may comprise with multiple cooperating cam components, shown as three matable components, 130, 132, 134. However, the cam C can be provided as a single component, two components or more than three components. The matable components can include aligned apertures 138 sized and configured to snugly receive the shaft 110. The apertures 138 can include a shaped segment, which may comprise a flat segment 138f for proper alignment.

Referring to FIG. 6, the cam assembly 100 can include the shaft 110 with the at least one notch 112, a multiple component cam C held by the shaft 110, and the at least one ring 120. The ring 120 includes circumferentially spaced apart, radially inwardly extending fingers 121 that engage a notch 112 (recess) in the shaft 110. Depending on the assembled width of the components, the ring 120 can engage different ones of the notches 112 while providing a tight locking engagement with a large axial pull off force. The use of at least one notch 112 with the self-locking ring 120 can provide a 10× increase in axial retention, e.g., in pull out force over a corresponding constant diameter shaft.

In some embodiments, the shaft 110 with the at least one notch 112 can have a pull out force that is between about 100 $lb_f$ to about 1000 $lb_f$ (axially), more typically between about 200 $lb_f$ and 800 $lb_f$, such as between about 300 $lb_f$ and 600 $lb_f$, while allowing flexibility in and/or immunity to different stack up dimensions for the components.

This assembly configuration allows for any number of stamped and/or cast parts to be assembled onto a shaft 110 and secured using a self-locking ring 120. Advantageously, the assembly configuration does not require precision machined components and is stack-up tolerance friendly so as to be able to accommodate a larger dimensional tolerance associated with multiple assembly configurations. Thus, while the shaft configuration is discussed primarily for a cam assembly 100, it can be used for other assemblies having a shaft that holds multiple components, typically multiple cooperating components, and can allow for different more cost effective components, such as cast and stamped components, with a greater tolerance range in part thickness.

The shaft 110 can also include a hub 115 that is axially spaced apart from the at least one notch 112 to form an end stop for the cam C to define the desired axial position of the cam C on the shaft 110 between the notch(es) 112 and the hub 115. The hub 115 can be an integral feature of the shaft or may be provided by an attached member which can be threaded, welded, frictionally engaged and/or welded. In yet another embodiment, another set of notches spaced apart from the first set of notches 112 can be provided with another at least one locking ring to form the end stop (not shown) without requiring the hub 115 or for locking engagement of the hub 115.

Figure 3:
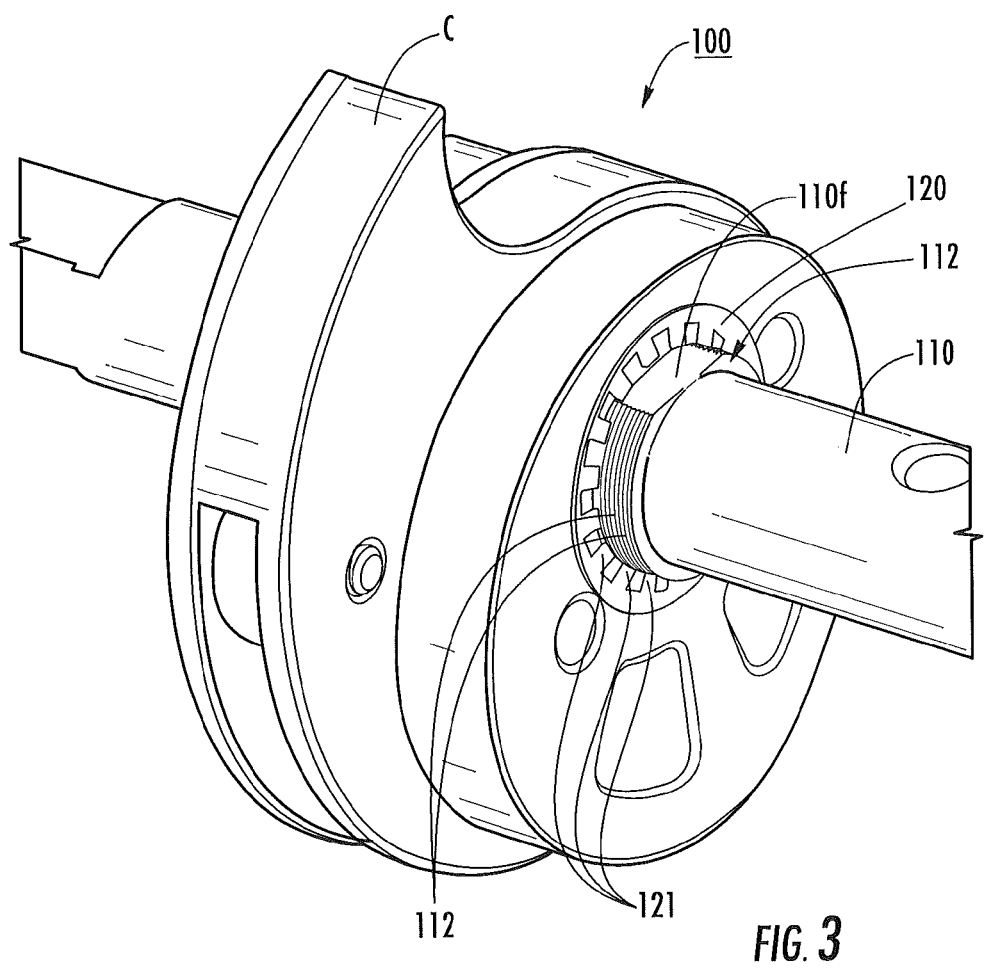
FIG. 3 is an enlarged partial side perspective view of a cam assembly according to embodiments of the present invention.

As shown in FIGS. 3 and 7, for example, the shaft 110 can include at least one external, longitudinally extending flat surface 110f, typically two symmetrically opposing flat surfaces 110f, that can extend through the notches 112. As shown the notches 112 are discontinuous about a perimeter of the shaft with opposing perimeter portions of respective notches separated by at least one flat segment 110f.

In the embodiment shown in FIG. 6, the components of the cam C can be assembled together via spaced apart longitudinally extending pins 137, at least one residing on opposite sides of the shaft aperture 138. Although shown as two pins 137, a single pin or more than two pins can be used. In other embodiments, other attachment members or configurations can be used. Additional parts such as a bearing or bearings can be installed between cam components, e.g., components 130, 132 to perform additional cam functions, for example.

The shaft 110 and/or cam C (e.g., components, 130, 132, 134) can comprise a cast or stamped metal, powder metal and/or metal alloy with a suitable hardness. In some particular embodiments, the shaft 110 is die cast metal with an integral hub 115 and integrally cast notches 112. In some embodiments, the notches 112 can be formed after casting or stamping. The shaft 110 and/or cam C can comprise a non-ferromagnetic material.

Figures 8A, 8B:
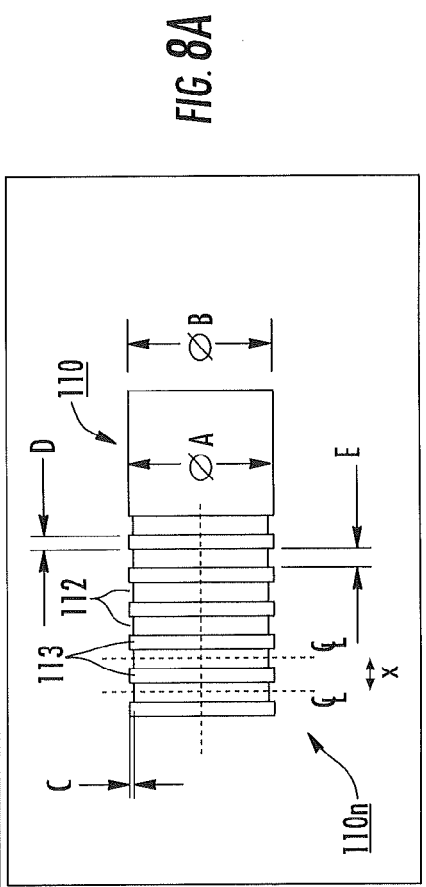
FIG. 8A is an enlarged view of a portion of a cam shaft suitable for use in the cam assembly of FIG. 3 according to embodiments of the present invention.
FIG. 8B is a table of exemplary dimensions and associated axial pull off forces (pounds) according to embodiments of the present invention.

FIG. 8A illustrates an enlarged view of an end portion of the shaft 110 to illustrate that the shaft 110 can have a series of tightly spaced apart notches 112 of the same size or various sizes and spacing, typically at least two notches 112 within about 0.025 inches of each other. In some embodiments, notch centerlines can reside within a distance "x" of each other, typically within about 0.050 inches of each other. The distance "x" can be less than or greater than 0.050 inches, including about 0.010 inches, about 0.015 inches, about 0.020 inches, about 0.025 inches, about 0.030 inches, about 0.035 inches, about 0.040 inches, about 0.045 inches and the like, depending on stack up tolerances allowed and degree of snugly locking engagement to prevent axial movement desired. The tighter or closer the spacing between notches, the tighter the tolerance resolution.

The shaft 110 can be configured so that øB-øA is between about 0.005 to about 0.020 inches, such as about 0.005 inches, about 0.010 inches, about 0.015 inches and about 0.020 inches. The outer wall segment diameter øB can be the same as the outer diameter of the shaft 110 at a location adjacent the notched segment 110n. In other embodiments, the outer wall segment diameter øB can be greater or even less than the outer wall diameter of the shaft at a location away from the notched zone.

The outer wall segment 113 can project a distance "c" beyond an adjacent notch outer wall surface. The distance "c" (or "groove or notch height") can vary or be the same and is typically between about 0.001 to about 0.010 inches, such as about 0.002, about 0.003, about 0.004, about 0.005, about 0.006, about 0.007, about 0.008, about 0.009 and about 0.010 inches (average), for example. In some embodiments, the distance "c" is about 0.005 inches.

The locking ring 120 can have an inner diameter defined by the innermost free ends that together define the inner diameter of the ring which is sized less than the outer diameter øB so that the fingers 121 can flex to reside inside a notch 112 while locking against axial movement using the ledge formed by the adjacent outer wall segment 113. The ring 120 can have a solid outer diameter segment and the fingers 121 can extend freely (e.g., have an inwardly facing free end) to provide a desired locking engagement with a respective notch 112. The locking ring can have various outer diameters and can have an inner diameter that is dictated by the size of the cooperating shaft to define an interior edge of the inner free end of the fingers 121. An exemplary self-locking external retaining ring is available from McMaster-Carr® under part number 98430A152 and provides exemplary dimensions.

Although shown in FIG. 8A as a series of six closely spaced notches 112, other numbers of notches may be used such as between 1-100 notches 112, or between 5-50 notches 112, for example. For example, one notch or more than one notch including, for example, two, three, four, five or six notches or more than six notches may be used, e.g., 6-10, 10-20, 20-30, 30-40, 40-50 and the like. Each notch 112 can be spaced apart and separated by pairs of outer protruding wall segments 113. The outer wall segments 113 can have the same width "D" or different widths and the same outer diameter øB or different outer diameters øB. The notches 112 can have the same width E and the same diameter øA or different widths E with the same diameters øA or different widths E and different diameters øA.

FIG. 8B is a table illustrating different dimensions and associated pull off forces (pounds/lbs) measured. The notched configuration with the single locking ring 120 provided about a 10× increase in pull out forces over an un-notched shaft of diameters of about 0.875 inches, 0.880 inches and 0.885 inches. The maximum measured pull-off force was obtained using sample 9 with the noted dimensions.

In some embodiments, the circuit breakers 10 can be DC circuit breakers, AC circuit breakers, or both AC and DC circuit breakers.

Figure 9:
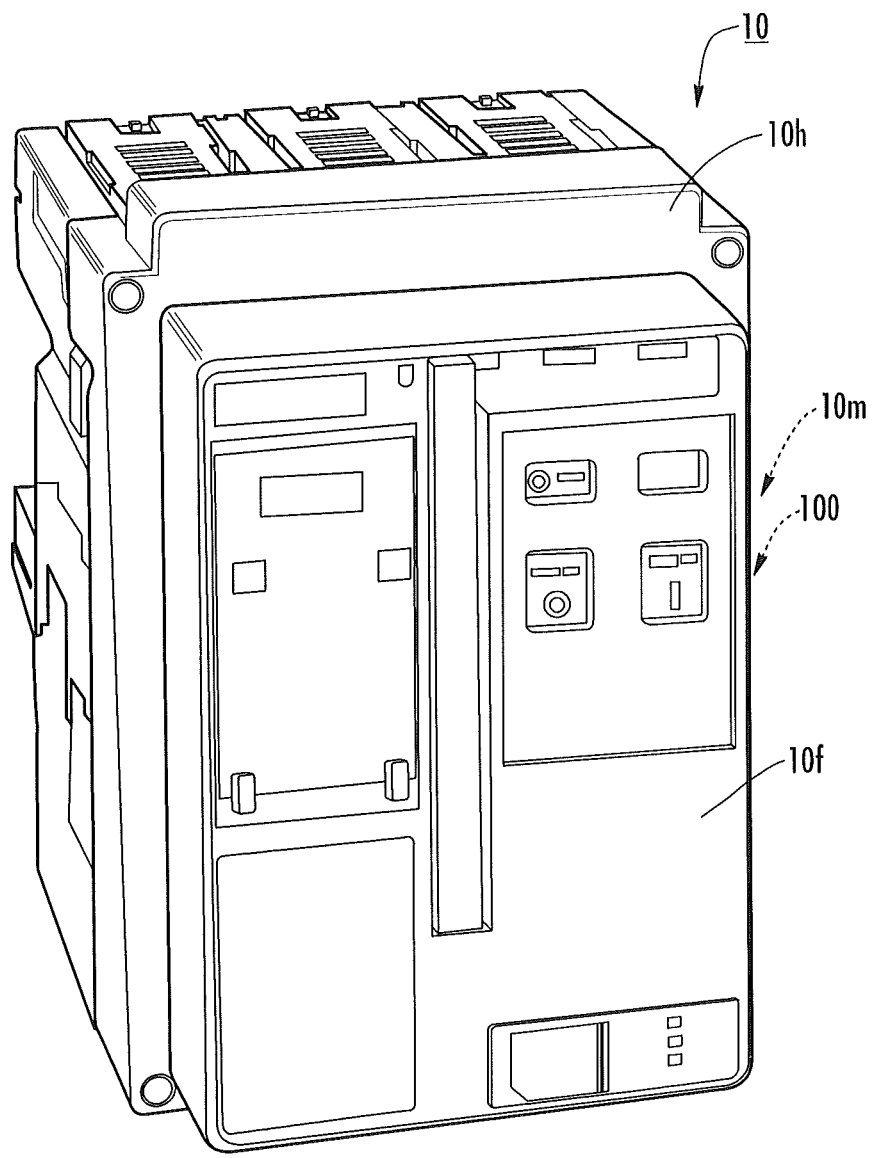
FIG. 9 is an exemplary circuit breaker that can include the cam assembly shown in FIG. 3 according to some embodiments of the present invention.

In some particular embodiments, as shown in FIG. 9, the circuit breaker 10 with the cam assembly 100 with the new shaft 110 and self-locking ring 120 can be an low voltage air circuit breaker such as a MAGNUM low voltage air circuit breaker or a medium voltage vacuum circuit breaker such as the Minivac™ breaker, both are from Eaton Corporation.

The circuit breakers 10 can be rated for voltages between about 1 V to about 5000 volts (V) DC and/or may have current ratings from about 15 to about 2,500 Amperes (A). However, it is contemplated that the circuit breakers 10 and components thereof can be used for any voltage, current ranges and are not limited to any particular application as the circuit breakers can be used for a broad range of different uses.

The circuit breakers 10 can be a bi-directional direct current (DC) molded case circuit breaker (MCCB). See, e.g., U.S. Pat. Nos. 5,131,504 and 8,222,983, the contents of which are hereby incorporated by reference as if recited in full herein. The DC MCCBs can be suitable for many uses such as data center, photovoltaic, and electric vehicles applications.

As is known to those of skill in the art, Eaton Corporation has introduced a line of molded case circuit breakers (MCCBs) designed for commercial and utility scale photovoltaic (PV) systems. Used in solar combiner and inverter applications, Eaton PVGard™ circuit breakers are rated up to 600 amp at 1000 Vdc and can meet or exceed industry standards such as UL 489B, which requires rigorous testing to verify circuit protection that meets the specific requirements of PV systems. However, it is contemplated that the circuit breakers 10 can be used for various applications with corresponding voltage capacity/rating.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed:

1. A cam assembly for a circuit breaker, comprising:
   a shaft comprising at least one notch;
   a cam held on the shaft; and
   at least one self-retaining locking ring that directly engages a respective one of the at least one notch to lock the cam in an axial position on the shaft,
   wherein the at least one notch comprises at least one circumferentially extending notch that is discontinuous about a perimeter of the shaft with opposing perimeter portions of a respective notch being separated by at least one flat segment.

2. A mechanism assembly for circuit breaker, comprising:
   a cam assembly, comprising:
      a shaft comprising at least one circumferentially extending external notch;
      a cam held on the shaft; and
      at least one self-retaining locking ring that comprises radially inwardly extending fingers that directly engage at least one of the at least one notch to lock the cam in axial position on the shaft; and
   a rotating contact arm in communication with the cam assembly,
   wherein the at least one notch has a substantially constant width and is discontinuous in a circumferential direction with opposing perimeter portions separated by at least one flat segment, and wherein the cam is non-ferromagnetic and comprises cast metal or metal alloy components.

3. The mechanism assembly of claim 2, wherein the cam comprises a plurality of components in abutting contact on the shaft, and wherein the at least one notch comprise a plurality of notches that are longitudinally spaced apart along the shaft with a pitch that accommodates dimensional build tolerances of the cam components.

4. The mechanism assembly of claim 2, wherein the cam comprises a plurality of cooperating components that are held in abutting contact at a defined axial location on the shaft using the at least one locking ring and at least one of the at least one external notch, and wherein the shaft and cam are non-ferromagnetic components.

5. The assembly of claim 2, wherein the at least one self-retaining locking ring engages a respective notch to define an axial pull off force that is between about 100 lbf to about 1000 lbf.

6. A mechanism assembly for circuit breaker, comprising:
(i) a cam assembly, comprising:
  a shaft comprising at least one circumferentially extending external notch;
  a cam held on the shaft; and
  at least one self-retaining locking ring that engages at least one of the at least one notch to lock the cam in axial position on the shaft, wherein the at least one notch is a plurality of closely spaced circumferentially extending notches with centerlines of adjacent notches spaced between about 0.001 inches to about 0.020 inches apart; and
(ii) a rotating contact arm in communication with the cam assembly.

7. The assembly of claim 6, wherein the cam has a curvilinear perimeter, and wherein the at least one self-retaining locking ring engages a respective notch to define an axial pull off force that is between about 100 lbf to about 1000 lbf.

* * * * *